United States Patent [19]

Knight et al.

[11] 3,885,646

[45] May 27, 1975

[54] DRY LAND AIRGUN IMPLEMENTATION SYSTEM

[75] Inventors: Joseph W. Knight; Kennis W. Gilbert, both of New Orleans, La.

[73] Assignee: Amoco Production Company, Tulsa, Okla.

[22] Filed: July 12, 1971

[21] Appl. No.: 161,577

[52] U.S. Cl................................. 181/114; 52/121
[51] Int. Cl............................................. G01v 1/04
[58] Field of Search.......... 181/.5 VM, 114; 92/151, 92/152, 137; 52/121; 175/1

[56] References Cited
UNITED STATES PATENTS 3,363,720  1/1968  Mifsud et al. ................. 181/.5 VM
3,393,763  7/1968  Sundt ............................. 181/.5 VM Primary Examiner—Maynard R. Wilbur
Assistant Examiner—T. M. Blum
Attorney, Agent, or Firm—John D. Gassett; Paul F. Hawley

[57] ABSTRACT

This invention relates to a system for generating seismic waves. It includes a vehicle for carrying an extensible mast. One end of each of two long stems is pivotally connected to opposite sides of the mast. When the mast is contracted, the stems are in a horizontal travelling position. After the mast is extended, the stems are rotated to a vertical operating position. While the stems are in the vertical position, the mast is retracted which forces the stem several feet into the earth. An air gun, attached to the outer end of the stem, is then actuated to generate a seismic signal. Then the mast is raised, raising the stems and air guns so that it can be readily moved to another location.

6 Claims, 6 Drawing Figures

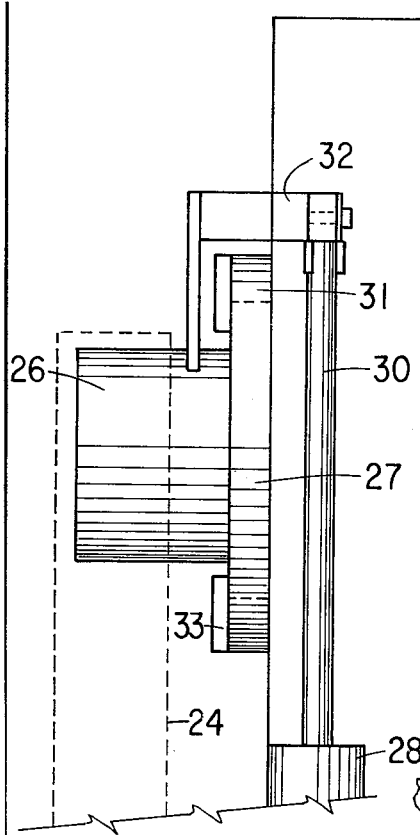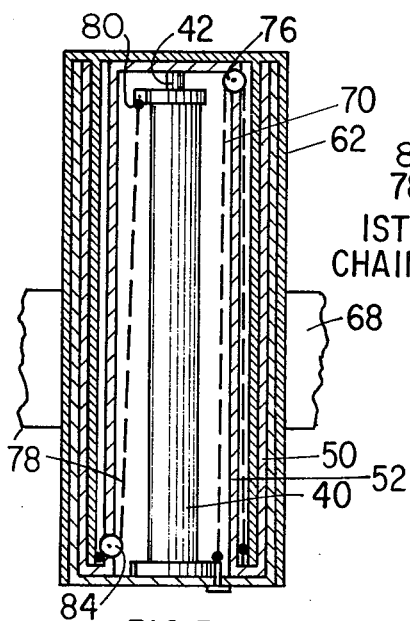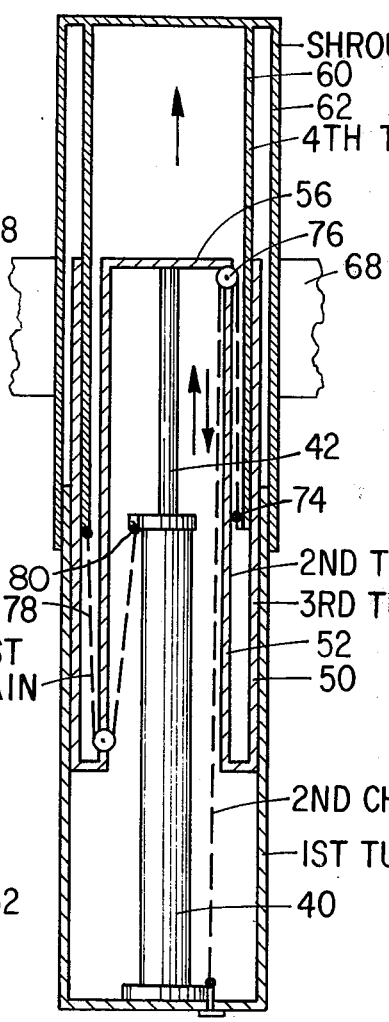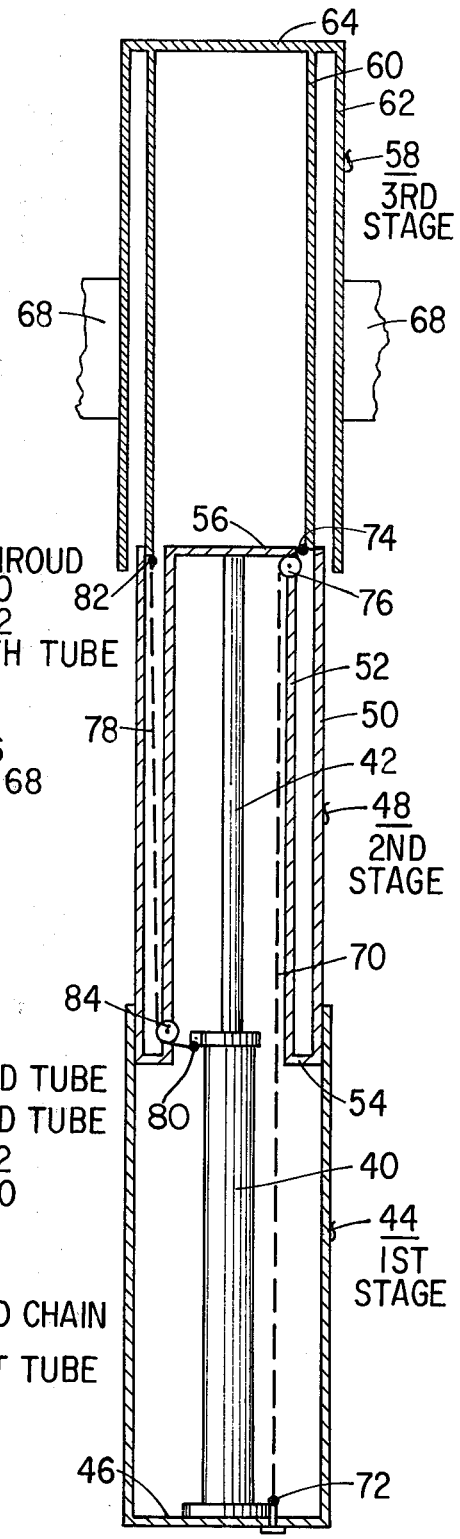

DRY LAND AIRGUN IMPLEMENTATION SYSTEM

BACKGROUND OF THE INVENTION

1. Field of Invention

This invention relates to a seismic source. It particularly relates to a vehicle movable source which carries air guns or the like which are forced into the earth, actuated, removed from the earth and moved to a new location.

2. Setting of the Invention

Geophysical prospecting is most important in the search for oil and gas. This type prospecting enables the location of subsurface structure which may contain oil. After such structures are found, a well is drilled to determine if it does in fact contain petroleum. In this type prospecting there must be a source which causes seismic signal to be imparted into the earth, and the reflected signal is reflected from subsurface structure and is recorded at the surface on detectors commonly called geophones. There are many type seismic sources known. Perhaps the most widely used is dynamite which is placed in a hole drilled 50–100 feet or more in the earth and then detonated.

Various type mechanical initiators have also been built and used. These include the weight dropping technique in which a weight is merely raised several feet off the ground and then dropped. There is also the vibrator which places a flat plate in contact with the earth and imparts vibrations to the earth through the plate. There are also other types such as air guns which operates somewhat like the familiar air hammer to impart a sudden shock to the earth. All of these various systems have been used and many with a great deal of success. However, prospectors are continually trying to find more economical and more efficient ways of generating a seismic signal. The present invention provides such an improved system.

BRIEF SUMMARY OF THE INVENTION

This apparatus concerns an apparatus for initiating a seismic signal in the earth and is useful primarily on dry land in contrast to water and marsh areas. It includes a means for inserting two air guns to a depth of about 10 feet into dry land. It includes an extensible mast supported by a vehicle. A long stem is connected by pivotal means to opposite sides of the mast. The stems are horizontal during transportation and are rotated to a vertical position when the mast is extended over a location in which it is desired to initiate a seismic signal. An impactor is connected into the upper end of each stem and a seismic source such as an air gun is connected to the ground end of each stem. The retracting of the extensible mast and the actuating of the impactor drives the stems, when in a vertical position, into the earth. When the desired depth is reached, the seismic source is actuated. The stems are then retracted by extending the mast and the entire seismic source can be moved to its next location.

BRIEF DESCRIPTION OF THE DRAWINGS

A better understanding of the invention and various modifications and pbjects thereof can be made with the following description taken in conjunction with the drawing.

FIG. 3, partly in cross-section, shows the mast in a retracted position.

FIG. 4 shows the mast of FIG. 3 in a partly extended position.

FIG. 5 illustrates the mast of FIG. 3 in a fully extended position.

FIG. 6 shows a side view of the pivotal attachment between a stem and the extensible mast.

Figure 1:
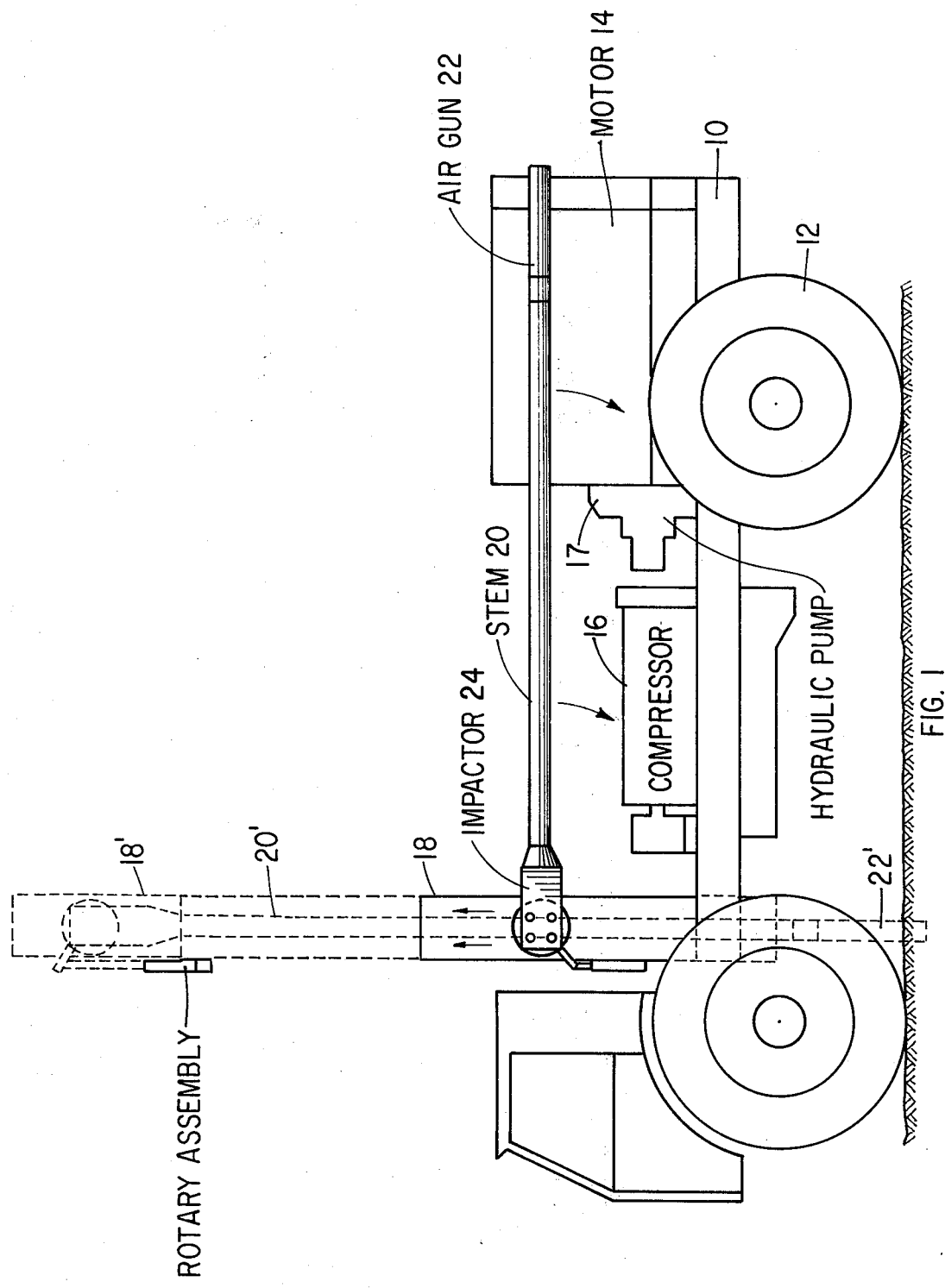
FIG. 1 illustrates the transportation vehicle, extensible mast and stems with air gun included.

Attention is first directed to FIG. 1 which shows a dry land air gun implementation system. Shown thereon is a truck having a bed 10 supported by wheels 12. Mounted thereon is motor 14, air compressor 16, and hydraulic pump 17. Also mounted on frame 10 is extensible mast 18. Rotatably supported from mast 18 is stem 20. Stem 20 has an air gun 22 mounted on the end away from the mast 18. An impactor means 24 is connected into stem 20. Impactor 24 is rotatably attached to mast 18. A suitable air gun is commercially available from SIE DRESSER of Houston, Tex. and is designated as Seis-mo-jet air. A suitable impactor 24 can be a hydraulically driven hammer such as is commercially available from Hughes Tool Company of Houston, Texas and is designated "Impactor." Another impactor means can be a mechanical vibrator phased for vertical addition and horizontal cancellation of forces.

Figure 2:
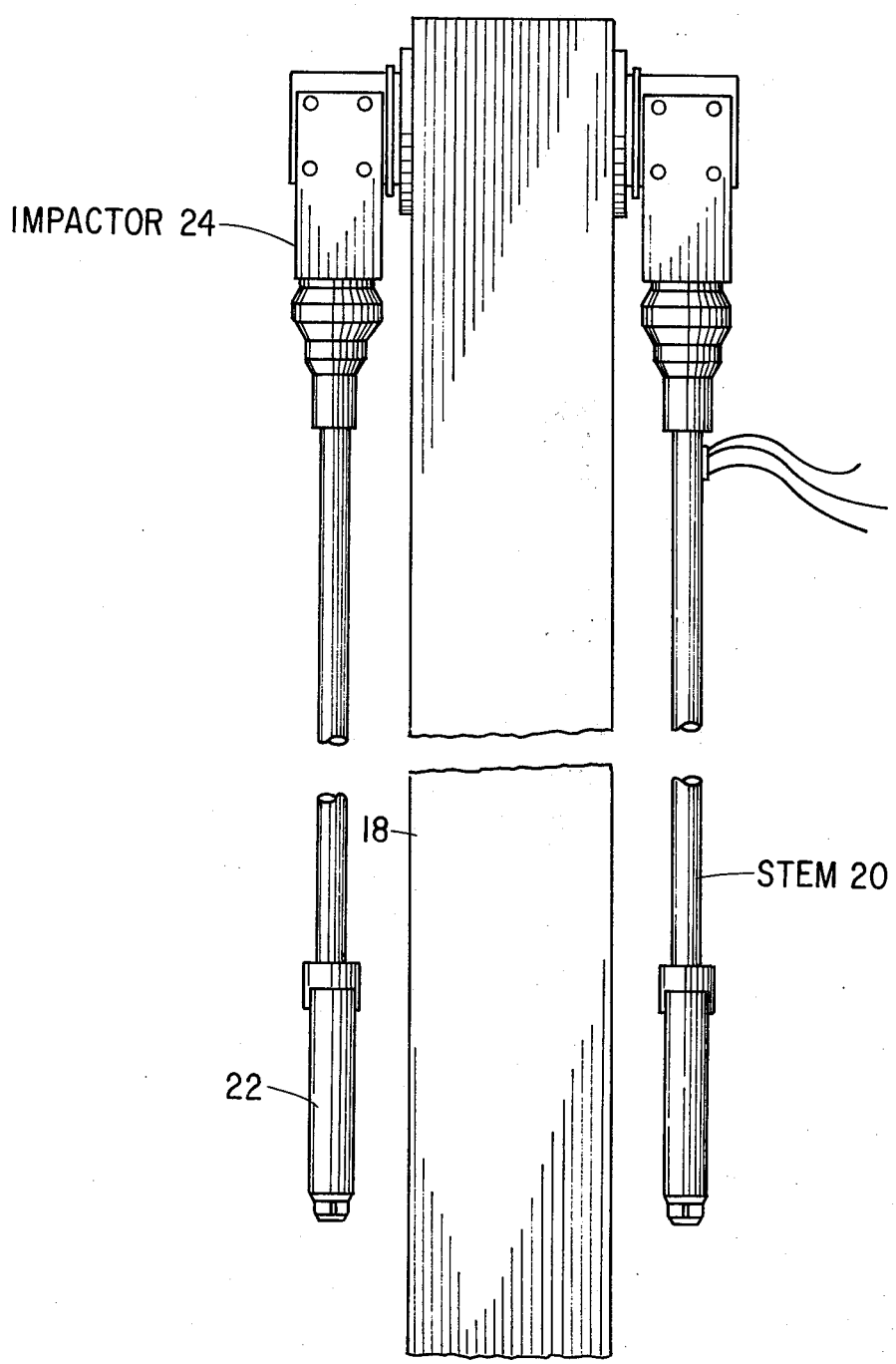
FIG. 2 shows a pair of stems pivotally attached to the extensible mast.

Although only one stem can be seen in FIG. 1 there is in reality, in the preferred embodiment, a stem on opposite sides of mast 18. This is shown in FIG. 2. As shown in FIG. 6 there is a pipe 26 to which the impactor 24 is connected. As this pipe rotates, the stem through impactor 24, is also rotated between a horizontal and vertical position. Pipe 26 is connected to disc 27, which is held in place by rings 31 and flange 33 which is supported by the mast. We will now discuss means for rotating pipe 26. That includes a hydraulic cylinder 28 having piston rod 30 connected to arm 32. As arm 32 is raised or lowered it rotates about a point which is the approximate center of pipe 26. Additional details of this is not shown inasmuch as any mechanics skilled in the art could provide a suitable rotary assembly for rotating pipe 26.

The dotted lines in FIG. 1 shows the mast in its extended position. This is indicated by reference numeral 18'. It is noted that the stem is indicated by dotted lines 20' and the air gun by dotted lines 22'. Thus the full line view of the stem and impactor and mast shows the apparatus in position for transportation whereas the dotted line illustration of the mast and stem assembly shows the device ready to force the air gun 22' into the area. The various hydraulic fluid lines and air lines from hydraulic pump 17 and compressor 16 to the various hydraulic and air motors have not been shown as they are well known and to add them would unduly complicate the drawing.

We shall first discuss the unique extensible mast. In doing this, attention is directed to FIGS. 3, 4, and 5. FIG. 3 shows the mast in its retracted position. Generally speaking it can be said that the mast uses a single stage, double acting hydraulic cylinder to obtain a stroke of approximately double that which the cylinder would normally provide. The mast includes a hydraulic cylinder and three metal tubes (preferably square) which fit inside one another with a sliding tolerance. Various "leaf" chains and roller bearing idlers allow free travel of the various metal tubes with respect to each other. We will now explain this in detail. These features are all shown in FIGS. 3, 4, and 5 with FIG. 3 showing a retracted mast, FIG. 5 a fully extended mast and FIG. 4 the mast in an intermediate position. FIG. 5 shows a hydraulic cylinder 40 having a fully extended piston rod 42. The lower end of cylinder 40 is connected to what can be described as a first stage 44. This first stage is preferably a square metal tube with a bottom 46 and opened at the top. The bottom 46 is connected to the bottom of hydraulic cylinder 40.

Just above first stage 44 and surrounding piston rod 42 is what can be described as the second stage 48. Stage 48 includes concentric tubes 50 and 52. The outer wall of tube 50 is slidably inserted inside the metal tube which comprises first stage 44. Annular plate 54 connects the lower end of tubes 50 and 52. The upper end of inner tube 52 of the second stage is enclosed by plate 56 which is attached to the upper end of piston rod 42. It should be noted here that it is not essential that either upper plate 56 or annular plate 54 be complete plates as their main purpose is to hold the various concentric members in a fixed position relative to each other.

The third stage 58 includes an inner tube 60 and an outer tube 62. The outer wall of inner tube 60 is slidably fitted within the inside wall of tube 50 of the second stage. Tube 60 and 62 are held in a fixed position with respect to each other by an upper plate 64. Tube 62 is in effect a shroud which has an inside diameter which makes a sliding fit with the outer surface of the first stage 44. It is to this outer tube 62 that the rotary assembly is connected. The structure for this indicated by reference numeral 68.

There are two chains which are used in conjunction with piston rod 42 to effect the extension and retraction of the mast. We shall first discuss the chain used in the extension of the mast, this includes chain 70 which is connected at one end to the point 72 which is at the lower end of cylinder 40 and at the other end to point 74 at the lower end of tube 60 of the third stage. Chain 70 passes over a pulley 76 which has its axis fixed to the upper end of tube 52. Pulley 76 mounted in an opening in the wall of such tube 52 and the opening is of such size as to both receive pulley 76 and to permit the free passage of chain 70. The length of chain 70 is essentially twice the stroke of piston rod 42.

We shall now discuss chain 78 which is used to effect retraction of the mast. One end of the chain is fixed at point 80 to the upper end of cylinder 40. The other end of the chain is connected at point 82 to the bottom end of tube 60 of the third stage. Chain 78 passes over pulley 84 which has its axis fixed to the lower end of inner tube 52 of the second stage. Pulley 84 is mounted in an opening near the lower end of tube 54, such opening be sufficiently large to readily receive pulley 84 and permit the free movement of chain 78 therethrough. Chain 78 is of a length essentially equal to the stroke of piston rod 42.

FIG. 3 shows the mast in its retracted position. All the parts described in FIG. 5 are in FIG. 3. It is important to note that pulley 84 is now at the bottom of cylinder 40 and pulley 76 is at the upper end of cylinder 40. When it is desired to extend the mast all that is necessary is to apply hydraulic fluid to cylinder 40 as piston rod 42 is extended as plate 56 is forced upwardly and carries with it pulley 76. As the bottom end of chain 70 is fixed with respect to cylinder 40, the other end of the chain at point 74 must move upwardly. This causes a third stage to move upwardly with respect to the second stage which carries pulley 76. It will be noted that the third stage moves up at twice the rate as the second stage. Continued upward movement of piston rod 42 results in a fully extended mast as shown in FIG. 5.

Retracting the mast is also very simple. All that is required is to drive piston rod 42 downwardly within cylinder 40. It will be recalled that the second stage is attached to the piston rod and it too will be driven downwardly. As the second stage is lowered it also forces down pulley 84. This pulls the third stage down and does so at the rate of the movement of the second stage. This is due to the formation of a loop in chain 78. Continued downward movement of piston rod 42 results in the mast being completely retracted back to the position shown in FIG. 3.

It is believed that now the operation of this system is apparent. The system is in its traveling position when in the position shown in FIG. 1, disregarding the dotted lines. The device is taken to location at which it is desired to initiate a seismic signal. At this time the operator raises the mast to its extended position. He then rotates the stem 20 to a vertical position as indicated by dotted lines in FIG. 1. At this point the operator does two things. He starts retracting mast 18 to force the gun into the soil and at the same time actuates impactor 24. He continues this until the air gun 22 has penetrated a selected distance into the earth, e.g. 10 feet. At this time air gun 22 is actuated to cause a seismic disturbance. After the "shot," the operator extends the mast to retrieve the stem and air gun from the hole. At this point the operator has the option of either a) completely raising the mast, rotating the stem to a horizontal position and collapsing the mast and moving on to the next location or b) to merely raise the mast just high enough so that the air gun 22 clears the ground for moving to the next location.

This system described is one which permits one man to operate the system and to also operate the vehicle. He does this by manipulating various valves to control the air and hydraulic fluids. Additionally, the telescoping mast is unique. This mast maintains a constant force while going up or down over the entire stroke. This is not the case with telescoping cylinder type mast of more than one stage.

While the above invention has been described with considerable detail, it is possible to make many modifications thereof without departing from the spirit or the scope of the invention.

We claim:

1. An apparatus for initiating a seismic signal in the earth which comprises:
   a vehicle;
   an extensible mast having a first portion extendible and retractable in the vertical direction, said mast having a nonextendible portion which is supported by said vehicle in a fixed position;
   a stem means;
   pivotal means connecting said stem means to said first portion of said extensible mast;
   means to rotate said stem means about said pivotal means in a vertical plane;
   said stem means including a seismic source connected to said stem means and impactor means connected into said stem means for driving said stem means downward.

2. An apparatus as defined in claim 1 in which said impactor means is a mechanical vibrator phased for vertical addition and horizontal cancellation of forces.

3. An apparatus as defined in claim 1 in which said extensible mast includes a hydraulic cylinder and a piston rod and including a first stage, a second stage and a third stage in which:

said first stage includes a first tube open at the top and surrounding said cylinder, the lower end of said first tube fixed to the lower end of said cylinder;

said second stage including a second tube interior of and spaced from said first tube, the top of said second tube fixed to said piston rod, a third tube surrounding said second tube and spaced therefrom, said third tube slideably fitted within said first tube, the lower ends of said second tube and said third tube secured in a fixed position with respect to each other;

said third stage including a fourth tube insertable between said second tube and said third tube, the outer wall of said fourth tube slideably fitting against the inner wall of said third tube;

a shroud fixed at its upper end to the upper end of said fourth tube and slideably surrounding said first tube;

a lower pulley carried by the lower end of said second tube;

an upper pulley carried by the upper end of said second tube;

a first chain having one end fixed to the upper end of said cylinder and extending around said lower pulley and having its other end fixed to the lower end of said fourth tube;

a second chain having one end fixed to the lower end of said cylinder and extending up over said upper pulley and having the other end fixed to the lower end of said fourth tube.

4. An apparatus as defined in claim 1 including stem means on opposite sides of said extensible mast.

5. An apparatus for initiating a seismic signal in the earth which comprises:

a vehicle;

an extensible mast having a first portion extendable and retractable in the vertical direction and a non-extendable portion which is supported by said vehicle in a fixed position relative to said vehicle;

a stem means;

pivot means connecting said stem means to said first portion of said extensible mast, said stem means not otherwise connected to said vehicle;

means to rotate said stem means about said pivot means in a vertical plane; and a seismic source connected to said stem means.

6. An apparatus as defined in claim 5 including an impactor means connected to said stem means.

* * * * *